United States Patent
Kim et al.

(10) Patent No.: US 11,655,991 B2
(45) Date of Patent: May 23, 2023

(54) AIR CONDITIONER AND METHOD OF CONTROLLING AIR CONDITIONER

(71) Applicant: Samsung Electronics Co., Ltd., Suwon-si (KR)

(72) Inventors: Young-Jin Kim, Suwon-si (KR); Seung Won Yeum, Yongin-si (KR); Hyo Ju Moon, Hwaseong-si (KR); Jong Hoon Park, Yongin-si (KR); Hyeong Joon Seo, Suwon-si (KR); Sung Jin In, Incheon (KR); Hong Seok Jun, Suwon-si (KR); Young Moo Huh, Suwon-si (KR); Kwang Il Nam, Suwon-si (KR); Sung Dai Cho, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 287 days.

(21) Appl. No.: 16/627,250

(22) PCT Filed: Apr. 17, 2018

(86) PCT No.: PCT/KR2018/004429
§ 371 (c)(1),
(2) Date: Dec. 27, 2019

(87) PCT Pub. No.: WO2019/004578
PCT Pub. Date: Jan. 3, 2019

(65) Prior Publication Data
US 2020/0132319 A1 Apr. 30, 2020

(30) Foreign Application Priority Data
Jun. 29, 2017 (KR) .................. 10-2017-0082756

(51) Int. Cl.
*F24F 11/00* (2018.01)
*F24F 1/0087* (2019.01)
(Continued)

(52) U.S. Cl.
CPC ...... *F24F 11/0008* (2013.01); *F24F 1/00075* (2019.02); *F24F 1/0087* (2019.02); *F24F 2110/20* (2018.01)

(58) Field of Classification Search
CPC .. F24F 11/0008; F24F 1/00075; F24F 1/0087; F24F 2110/20
See application file for complete search history.

(56) References Cited

U.S. PATENT DOCUMENTS 4,107,939 A * 8/1978 Bolton .................. F24F 1/027
261/90
5,345,776 A 9/1994 Komazaki et al.
(Continued)

FOREIGN PATENT DOCUMENTS

EP 1398576 B1 * 12/2010 ............... F24F 3/14
JP H9-133391 A 5/1997
(Continued)

OTHER PUBLICATIONS

ISA/KR, International Search Report and Written Opinion of the International Searching Authority, International Application No. PCT/KR2018/004429, dated Jul. 31, 2018, 13 pages.
(Continued)

*Primary Examiner* — Henry T Crenshaw (57) ABSTRACT

An air conditioner of the disclosure includes a compressor; an indoor heat exchanger temperature sensor configured to sense an indoor heat exchanger temperature; an indoor humidity sensor configured to sense indoor humidity; and a controller configured to calculate a dew point temperature using the humidity value detected by the indoor humidity
(Continued)

sensor and an indoor set temperature, and control a frequency of the compressor based on the calculated dew point temperature and the indoor heat exchanger temperature.

13 Claims, 5 Drawing Sheets

(51) Int. Cl.
*F24F 1/0007* (2019.01)
*F24F 110/20* (2018.01)

(56) References Cited

U.S. PATENT DOCUMENTS

| | | | | |
|---|---|---|---|---|
| 2008/0028779 | A1* | 2/2008 | Song | F25B 41/31 |
| | | | | 62/190 |
| 2010/0293976 | A1* | 11/2010 | Tsutsumi | F24F 1/00077 |
| | | | | 62/176.6 |
| 2014/0345307 | A1 | 11/2014 | Bagley et al. | |
| 2016/0377310 | A1 | 12/2016 | Hong et al. | |

FOREIGN PATENT DOCUMENTS

| | | | |
|---|---|---|---|
| JP | H11-218350 A | | 8/1999 |
| JP | 2002-286275 A | | 10/2002 |
| JP | 2002286275 A | * | 10/2002 |
| JP | 2003-139343 A | | 5/2003 |
| JP | 2004-101164 A | | 4/2004 |
| JP | 5975937 B2 | | 8/2016 |
| KR | 10-2014-0044226 A | | 4/2014 |
| KR | 10-2015-0063302 A | | 6/2015 |

OTHER PUBLICATIONS

Notice of Preliminary Rejection dated Dec. 16, 2021, in connection with Korean Application No. 10-2017-0082756, 9 pages.
Supplementary European Search Report dated Apr. 3, 2020, in connection with European Application No. 18824350.5, 8 pages.
Korea Intellectual Property Office, "Notice of Final Rejection," dated Jun. 20, 2022, in connection with Korean Patent Application No. 10-2017-0082756, 6 pages.
Notice of Decision of Final Rejection dated Oct. 18, 2022 in connection with Korean Patent Application No. 10-2017-0082756, 8 pages.

* cited by examiner

FIG. 5

AIR CONDITIONER AND METHOD OF CONTROLLING AIR CONDITIONER

CROSS-REFERENCE TO RELATED APPLICATIONS

This application is a 371 National Stage of International Application No. PCT/KR2018/004429, filed Apr. 17, 2018, which claims priority to Korean Patent Application No. 10-2017-0082756, filed Jun. 29, 2017, the disclosures of which are herein incorporated by reference in their entirety.

BACKGROUND

1. Field

Embodiments of the disclosure relate to an air conditioner and a method of controlling the air conditioner.

2. Description of Related Art

An air conditioner is an apparatus that cools or heats indoor air. The air conditioner performs cooling by using the characteristic of absorbing the surrounding heat when a liquid refrigerant vaporizes, and performs heating by using the characteristic of releasing heat when a gaseous refrigerant liquefies.

A typical air conditioner generally connects a single indoor unit to a single outdoor unit. However, in recent times, demand for a system air conditioner which connects a plurality of the indoor units having various types and capacities to the single outdoor unit, is increasing.

Recently, when the air conditioner performs dehumidification, the dehumidification is controlled using a fixed constant compressor frequency that is obtained by calculating a temperature difference between the indoor set temperature and the indoor suction temperature and a threshold value by the indoor and outdoor temperatures.

The humidity control of the air conditioner is an indirect control, which removes only sensible heat and does not remove latent heat (humidity), and thus the relative humidity may be high to a user even after reaching a requested set temperature.

In addition, when the compressor enters a minimum operation without the latent heat removed, residual condensate in an indoor heat exchanger may be evaporated by an indoor fan, and a humidification effect may occur.

SUMMARY

One aspect provides an air conditioner and a method of controlling the air conditioner to directly control indoor temperature and humidity to provide an optimal temperature and humidity for a user to feel comfortable.

In accordance with an aspect of the disclosure, an air conditioner may include a compressor; an indoor heat exchanger temperature sensor configured to sense an indoor heat exchanger temperature; an indoor humidity sensor configured to sense indoor humidity; and a controller configured to calculate a dew point temperature using a humidity value detected by the indoor humidity sensor and an indoor set temperature, and control a frequency of the compressor based on the calculated dew point temperature and the indoor heat exchanger temperature.

The controller may calculate a frequency change amount of the compressor based on a temperature difference between the dew point temperature and the indoor heat exchanger temperature and a change amount of the indoor heat exchanger temperature.

The controller may calculate a current compressor frequency by reflecting a frequency change amount of the compressor on a previous compressor frequency, and controls the frequency of the compressor based on the calculated current compressor frequency.

The controller may calculate a frequency change amount of the compressor by applying the temperature difference between the dew point temperature and the indoor heat exchanger temperature and the change amount of the indoor heat exchanger temperature to a compressor fuzzy table.

The compressor fuzzy table may be configured to decrease the compressor frequency when the indoor heat exchanger temperature is gradually lowered or falls below the dew point temperature, and increase the compressor frequency when the indoor heat exchanger is gradually increased or exceeds the dew point temperature.

The controller may calculate the current compressor frequency based on a previous compressor frequency and the frequency change amount of the compressor, and may control a rotation speed of an outdoor fan using the calculated current compressor frequency and an outdoor temperature.

The controller may calculate the current compressor frequency based on a previous compressor frequency and the change amount in the frequency of the compressor, and may control an electronic expansion valve using the calculated current compressor frequency and room temperature and outdoor temperature.

The controller may control to maintain the indoor heat exchanger temperature to be lower than the dew point temperature.

In accordance with another aspect of the disclosure, A method of controlling an air conditioner, the method may comprise calculating a dew point temperature using a humidity value detected by an indoor humidity sensor and an indoor set temperature when a cooling or dehumidification operation is driven; calculating a temperature difference between the dew point temperature and an indoor heat exchanger temperature, and a temperature change amount of an indoor heat exchanger; calculating a frequency change amount of a compressor based on the temperature difference between the dew point temperature and the indoor heat exchanger temperature and the temperature change amount of the indoor heat exchanger; calculating a current compressor frequency based on the frequency change amount of the compressor and a previous compressor frequency; and controlling the compressor using the current compressor frequency.

The calculating of the frequency change amount of the compressor may comprise applying the temperature difference between the dew point temperature and the indoor heat exchanger temperature and the change amount of the indoor heat exchanger temperature to a compressor fuzzy table, to calculate the frequency change amount of the compressor.

The compressor fuzzy table may be configured to decrease the compressor frequency when the indoor heat exchanger temperature is gradually lowered or falls below the dew point temperature, and increase the compressor frequency when the indoor heat exchanger is gradually increased or exceeds the dew point temperature.

In accordance with another aspect of the disclosure, a control method of an air conditioner, the method may comprise calculating a dew point temperature using a humidity value detected by an indoor humidity sensor and an indoor set temperature when a cooling or dehumidification operation is driven; calculating a temperature difference between the dew point temperature and an indoor heat exchanger temperature, and a temperature change amount of an indoor heat exchanger; calculating a frequency change amount of a compressor using the temperature difference between the dew point temperature and the indoor heat exchanger temperature and the change amount of the indoor heat exchanger temperature; calculating a current compressor frequency based on the frequency change amount of the compressor and a previous compressor frequency; and controlling a rotation speed of an outdoor fan using the calculated current compressor frequency and an outdoor temperature.

The calculating of the frequency change amount of the compressor may comprise applying the temperature difference between the dew point temperature and the indoor heat exchanger temperature and the change amount of the indoor heat exchanger temperature to a compressor fuzzy table, to calculate the frequency change amount of the compressor.

In accordance with another aspect of the disclosure, the method comprise calculating a dew point temperature using a humidity value detected by an indoor humidity sensor and an indoor set temperature when a cooling or dehumidification operation is driven; calculating a temperature difference between the dew point temperature and an indoor heat exchanger temperature, and a temperature change amount of an indoor heat exchanger; calculating a frequency change amount of a compressor using the temperature difference between the dew point temperature and the indoor heat exchanger temperature and the temperature change amount of the indoor heat exchanger temperature; calculating a current compressor frequency based on the frequency change amount of the compressor and a previous compressor frequency; and controlling an electronic expansion valve using the calculated current compressor frequency and indoor and outdoor temperatures.

the calculating of the frequency change amount of the compressor may comprise applying the temperature difference between the dew point temperature and the indoor heat exchanger temperature and the change amount of the indoor heat exchanger temperature to a compressor fuzzy table, to calculate the frequency change amount of the compressor.

According to the above disclosure, since the humidity is directly controlled by the air conditioner to remove sensible heat and latent heat at the same time, an effect of maintaining the optimum temperature and humidity can be expected.

Also, the disclosed embodiment can maximize the dehumidification effect by always keeping the indoor heat exchanger temperature lower than the dew point temperature. It is possible to prevent a humidification phenomenon occurring during the minimum operation of the compressor.

In addition, since the disclosed embodiment enables the gradual control of the compressor frequency, it can be easy to follow the target frequency value by reducing the frequency control vibration compared to conventional dehumidification.

DETAILED DESCRIPTION

Reference will now be made in detail to the embodiments of the disclosure, examples of which are illustrated in the accompanying drawings, wherein like reference numerals refer to like elements throughout. This specification does not describe all elements of the embodiments of the disclosure and detailed descriptions on what are well known in the art or redundant descriptions on substantially the same configurations may be omitted.

The terms 'unit, module, member, and block' used herein may be implemented using a software or hardware component. According to an embodiment, a plurality of 'units, modules, members, or blocks' may also be implemented using an element and one 'unit, module, member, or block' may include a plurality of elements.

Throughout the specification, when an element is referred to as being "connected to" another element, it may be directly or indirectly connected to the other element and the "indirectly connected to" includes being connected to the other element via a wireless communication network.

Also, it is to be understood that the terms "include" and "have" are intended to indicate the existence of elements disclosed in the specification, and are not intended to preclude the possibility that one or more other elements may exist or may be added.

In this specification, the terms "first," "second," etc. are used to distinguish one component from other components and, therefore, the components are not limited by the terms.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Hereinafter, embodiments of the disclosure will be described in detail with reference to the accompanying drawings.

Figure 1:
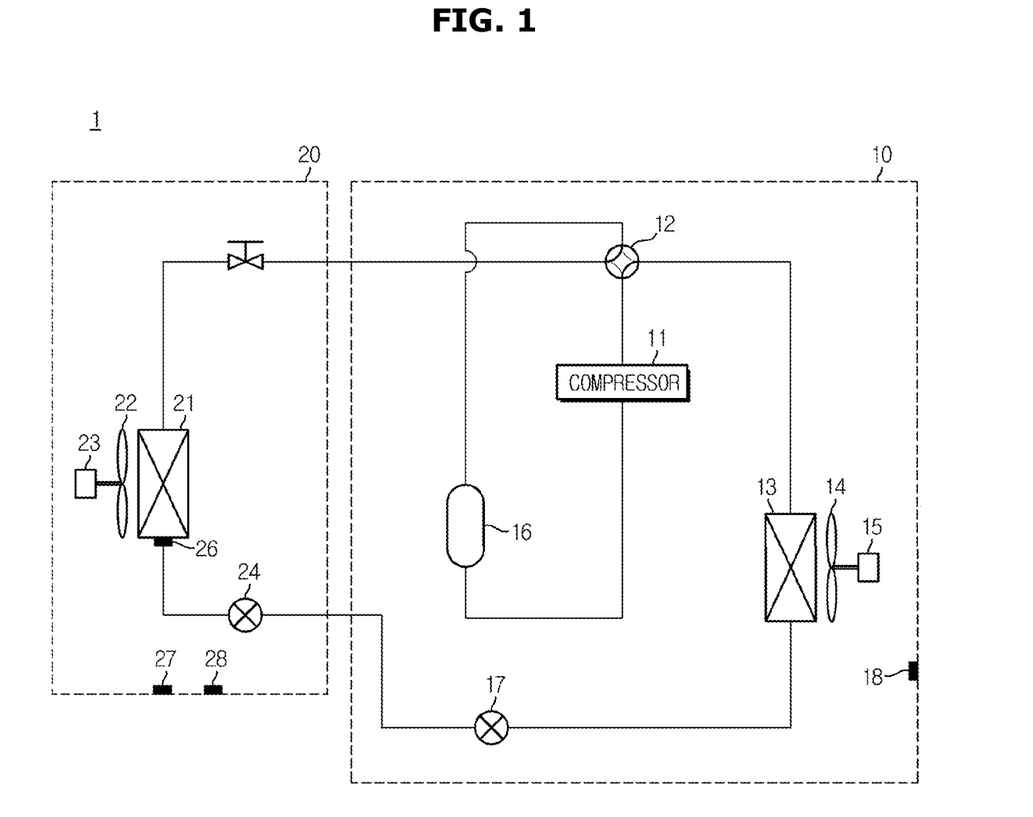
FIG. 1 is a diagram illustrating a configuration of an air conditioner.

FIG. 1 is a diagram illustrating a configuration of an air conditioner.

Referring to FIG. 1, an air conditioner 1 may include an outdoor unit 10 and an indoor unit 20. Although not shown, the outdoor unit 10 and the indoor unit 20 may be provided with a communicator to transmit and receive power and communication signals between each other.

The communicator may include one or more components that enable communication with an external device, and may include, for example, at least one of a near field communication module, a wired communication module, and a wireless communication module.

The near field communication module includes a Bluetooth module, an infrared communication module, a radio frequency identification (RFID) communication module, a wireless local access network (WLAN) communication module, an NFC communication module, a Zigbee communication module, etc., for transmitting and receiving signals using a wireless communication network in a local area.

The wired communication module includes a variety of wired communication modules, such as local area network (LAN) modules, wide area network (WAN) modules, or value added network (VAN) modules, and also includes a variety of cable communication modules, such Universal Serial Bus (USB), High Definition Multimedia Interface (HDMI), Digital Visual Interface (DVI), returned standard 232 (RS-232), power line communication, or plain old telephone service (POTS).

The wireless communication module includes a wireless communication module that supports various wireless communication schemes, such as Wi-Fi modules and Wireless broadband modules, global system for mobile communication (GSM), code division multiple access (CDMA), wideband code division multiple access (WCDMA), universal mobile telecommunications system (UMTS), Time Division Multiple Access (TDMA), and Long Term Evolution (LTE).

First, the outdoor unit 10 includes a compressor 11 for compressing a refrigerant into a gas state of high temperature and high pressure, a four-way valve 12 for adjusting the flow direction of the high temperature and high pressure gas refrigerant compressed by the compressor 11, an outdoor heat exchanger 13 which receives the compressed high temperature and high pressure gas refrigerant from the compressor 11 and heat exchanges with outdoor air; an outdoor fan 14 for forcibly blowing the outdoor air by an outdoor fan motor 15 so that the heat exchange is performed in the outdoor heat exchanger 13, and an electronic expansion valve 17 for decompressively expanding the heat exchanged refrigerant while adjusting the flow rate of the refrigerant. At this time, the electronic expansion valve (EEV) 17 may adjust the superheat degree and the supercooling degree of the refrigerant according to the opening degree thereof.

In addition, an accumulator 16 for converting the refrigerant flowing into the compressor 11 into a gas in a completely gaseous state may be provided on the suction side of the compressor 11.

In addition, the outdoor unit 10 may include an outdoor temperature sensor 18 for sensing the outdoor air temperature. At this time, it is a matter of course that the outdoor temperature sensor 18 can be installed at any position where it can sense the temperature of the outdoor air or where outdoor temperature measurement is required by an operator.

In addition, the indoor unit 20 includes an indoor heat exchanger 21 for receiving heat and exchanging heat with indoor air; and an indoor fan 22 for forcibly blowing the indoor air by an indoor fan motor 23 so that the heat exchange is performed in the indoor heat exchanger 21.

Also, an electronic expansion valve 24 for expanding the refrigerant in an inlet pipe in which the refrigerant is sucked during the cooling operation connected to the indoor heat exchanger 21 and an indoor heat exchanger temperature sensor 26 for detecting an inlet pipe temperature of the indoor heat exchanger 21 may be installed.

In addition, the indoor unit 20 may further include an indoor humidity sensor 27 for detecting indoor humidity. The indoor humidity sensor 27 detects relative humidity in the air flowing into the indoor unit 20, but the embodiment is not limited thereto and can be changed according to the needs of the operator. In this case, the indoor humidity sensor 27 may be installed at any position where it is possible to detect the indoor humidity or where indoor humidity measurement is required by the operator.

In addition, the indoor unit 20 may further include an indoor temperature sensor 28 for sensing the indoor temperature. In this case, the indoor temperature sensor 28 may be installed at any position where the temperature of the indoor air can be detected or where temperature measurement of the indoor air is required by the operator.

Figure 2:
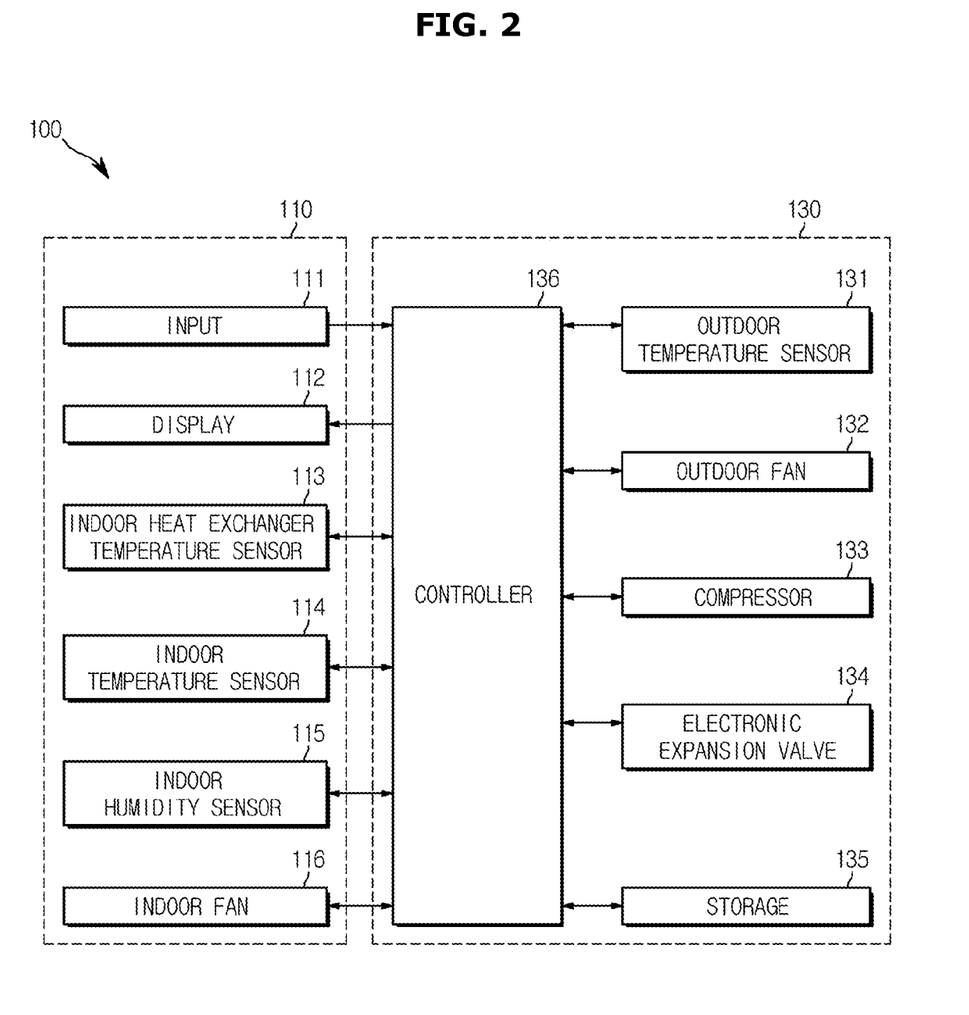
FIG. 2 is a diagram showing in detail a control block diagram of an air conditioner.

FIG. 2 is a diagram showing in detail a control block diagram of an air conditioner.

Referring to FIG. 2, an air conditioner 100 includes an indoor unit comprising an input 111, a display 112, an indoor heat exchanger temperature sensor 113, an indoor temperature sensor 114, an indoor humidity sensor 115, and an indoor fan 116.

Also, the air conditioner 100 includes an outdoor unit comprising an outdoor temperature sensor 131, an outdoor fan 132, a compressor 133, an electronic expansion valve 134, a storage 135, and a controller 136.

At this time, an indoor unit 120 and an outdoor unit 130 may be provided with a communicator to transmit and receive power and communication signals between each other.

The input 111 is configured to allow a user to generate a driving command or input a setting value for controlling the operation of the air conditioner 100.

The input 111 may include hardware devices such as various buttons, switches, and keyboards for user input.

In addition, the input 111 may include a graphical user interface (GUI) such as a touch pad or the like, for the user input. The touch pad may be implemented as a touch screen panel (TSP) to form a mutual layer structure with the display 112.

When the touch screen panel (TSP) forms a layer structure with the touch pad, the display 112 may also be used as the input 111.

The display 112 is a component for visually displaying information related to the operation of the air conditioner 100. For example, the display 112 may display a set temperature, a current temperature, a current humidity, a cooling mode, a reservation time, and the like.

The display 112 can be a Cathode Ray Tube (CRT), a Digital Light Processing (DLP) Panel, a Plasma Display Panel, a Liquid Crystal Display (LCD) Panel, an Electro Luminescence (EL) Panel, an Electrophoretic Display (EPD) panel, an Electrochromic Display (ECD) panel, a Light Emitting Diode (LED) panel, or an Organic Light Emitting Diode (OLED) panel, but it is not limited thereto.

The indoor heat exchanger temperature sensor 113 may be a component for detecting an indoor heat exchanger temperature. As shown in FIG. 1, the indoor heat exchanger temperature sensor 26 may be installed at a position for detecting an inlet pipe temperature of the indoor heat exchanger 21. Not limited thereto, it may be possible to be installed at a position other than the inlet side of the indoor heat exchanger 21 according to the needs of the operator to measure the temperature of the indoor heat exchanger 21.

The indoor temperature sensor 114 may be a component for sensing the indoor temperature. The indoor temperature sensor 114 may be installed anywhere to detect the temperature of the indoor air in which the air conditioner 100 is installed.

The indoor humidity sensor 115 may be a component for sensing the indoor humidity. The indoor humidity sensor 115 may be installed anywhere to detect the humidity of a room where the air conditioner 100 is installed.

The indoor fan 116 may be configured to forcibly blow indoor air by the indoor fan motor (23 of FIG. 1) so that the heat exchange is performed in the indoor heat exchanger (21 of FIG. 1).

The indoor fan 116 may change the rotation speed of the indoor fan 116 according to a control signal transmitted from the controller 136.

The outdoor temperature sensor 131 may be a component for sensing outdoor temperature. The outdoor temperature sensor 131 may be installed anywhere where the outdoor air temperature can be sensed.

The outdoor fan 132 may be configured to forcibly blow outdoor air by the outdoor fan motor (15 of FIG. 1) so that the heat exchange is performed in the outdoor heat exchanger (13 of FIG. 1).

The outdoor fan 132 may change the rotation speed of the outdoor fan 132 according to a control signal transmitted from the controller 136.

The compressor 133 may be configured to compress the refrigerant into a gaseous state of high temperature and high pressure.

The storage 135 may be configured to store various settings and control information related to the operation of the air conditioner 100. For example, the storage 135 may store the indoor setting temperature, fuzzy table information, or the like inputted by the user or initially set.

The storage 135 may be implemented by at least one of a nonvolatile memory device such as cache, read only memory (ROM), programmable ROM (PROM), erasable programmable ROM (EPROM), electrically erasable programmable ROM (EEPROM), and flash memory or a volatile memory device such as a memory, a storage medium such as a hard disk drive (HDD), a CD-ROM, or random access memory (RAM), but is not limited thereto. The storage may be a memory implemented as a chip separate from the processor described above with respect to the controller, or may be implemented as a single chip with the processor.

The controller 136 calculates a dew point temperature by using the humidity value detected by the indoor humidity sensor 115 and the indoor set temperature. The frequency of the compressor 133 may be controlled based on the calculated dew point temperature and the indoor heat exchanger temperature.

In detail, the controller 136 may calculate the frequency change amount of the compressor based on the temperature difference between the dew point temperature and the indoor heat exchanger temperature and the change amount of the indoor heat exchanger temperature.

The controller 136 may calculate the frequency change amount of the compressor 133 by applying the temperature difference between the dew point temperature and the indoor heat exchanger temperature and the change amount of the indoor heat exchanger temperature to the compressor fuzzy table.

The compressor fuzzy table decreases the compressor frequency when the indoor heat exchanger temperature gradually decreases or falls below the dew point temperature, and increases the compressor frequency when the indoor heat exchanger temperature is gradually increased or exceeds the dew point temperature.

The disclosed embodiment applies the temperature difference between the dew point temperature and the indoor heat exchanger temperature and the amount of change in the indoor heat exchanger temperature to the compressor fuzzy table to sequentially control the frequency of the compressor, so that the compressor is based only on the current temperature and the set temperature. Compared to the conventional method of controlling the frequency so that the step changes abruptly when the frequency band changes, the frequency control vibration (Hunting) is reduced, it can be easy to follow the target frequency value.

In addition, the conventional frequency band control consumes 100% of power for each frequency band because the control is performed in a fixed frequency band unit. Since the disclosed embodiment performs better frequency control in frequency control than in the related art, power consumption can be expected when cooling or dehumidifying an air conditioner without unnecessary power consumption.

The controller 136 may calculate the current compressor frequency based on the previous compressor frequency and the amount of change in the compressor, and control the rotation speed of the outdoor fan by using the calculated current compressor frequency and the outdoor temperature.

A factor required to control the rotation speed of the outdoor fan is to control the rotation speed of the outdoor fan by using the current compressor frequency and the outdoor temperature calculated by the above-described method with the current compressor frequency and the outdoor temperature.

In addition, the controller 136 may calculate the current compressor frequency based on the previous compressor frequency and the change amount of the compressor, and may also control the rotation speed of the indoor fan by using the calculated current compressor frequency and room temperature.

The controller 136 calculates the current compressor frequency based on the previous compressor frequency and the frequency change amount of the compressor. The flow rate of the refrigerant may be adjusted by controlling the electronic expansion valve 134 using the calculated current compressor frequency, room temperature, and outdoor temperature.

Factors required to control the electronic expansion valve 134 are the current compressor frequency, which is calculated from the outdoor temperature and room temperature, and adjusting the opening degree of the electronic expansion valve 134 by using the outdoor temperature and room temperature calculated in the above-described manner to adjust the refrigerant flow rate.

The controller 136 may control the indoor heat exchanger temperature to be lower than the dew point temperature. Since the controller 136 controls the indoor heat exchanger temperature to be lower than the dew point temperature to control dehumidification at all times, the controller 136 may expect an effect of maintaining an appropriate humidity in a space where the air conditioner 100 is provided.

The controller 136 performs the above-described operation using a memory (not shown) that stores data for an algorithm or a program that reproduces the algorithm for controlling the operation of the components in the air conditioner 100, and the data stored in the memory. It may be implemented by a processor (not shown). In this case, the memory and the processor may be implemented as separate chips or the memory and the processor may be implemented in a single chip.

At least one component may be added or deleted to correspond to the performance of the components of the air conditioner 100 illustrated in FIG. 2. In addition, it will be readily understood by those skilled in the art that the mutual position of the components may be changed corresponding to the performance or structure of the system.

On the other hand, each component shown in the air conditioner 100 refers to a software component and/or a hardware component such as a Field Programmable Gate Array (FPGA) and an Application Specific integrated Circuit (ASIC).

Figure 3:
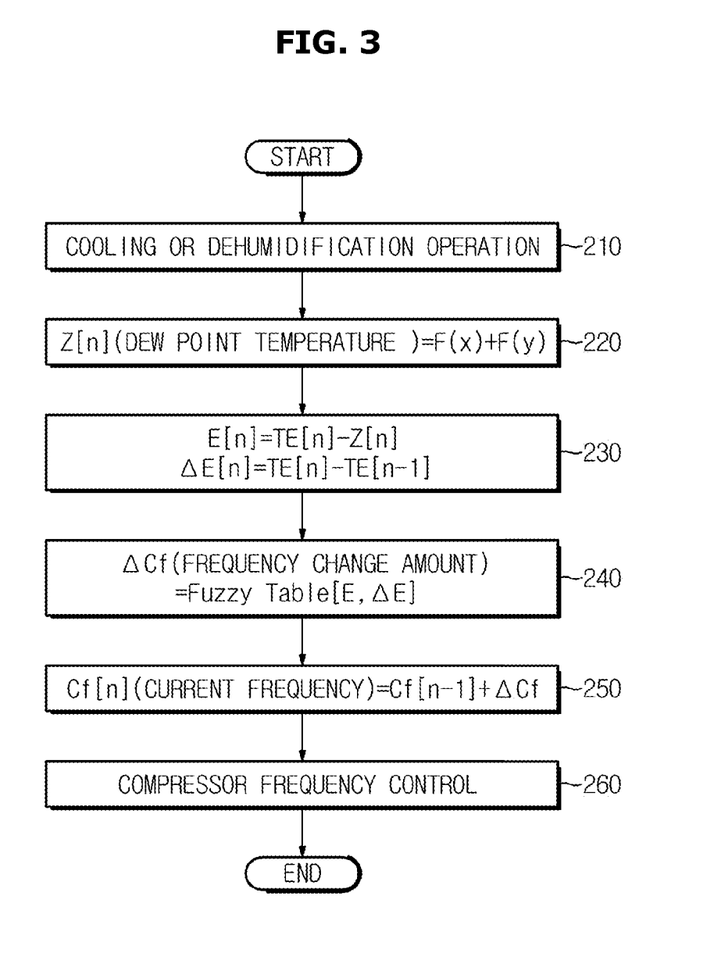
FIG. 3 is a flowchart illustrating a cooling or dehumidifying operation method by an air conditioner.

FIG. 3 is a flowchart illustrating a cooling or dehumidifying operation method by an air conditioner.

Referring to FIG. 3, when the cooling or dehumidifying operation is driven, the air conditioner 100 may calculate the dew point temperature by using the humidity value detected by the indoor humidity sensor 115 and the indoor set temperature (210, 220). In this case, the indoor set temperature may be input by the user through the input 111 or may be preset in the air conditioner 100.

The air conditioner 100 may calculate the dew point temperature through Equation 1.

$$Z[n]=F(x)+F(y) \quad \text{[Equation 1]}$$

In this case, Z may represent the dew point temperature, x may represent the room set temperature, and y may refer to the humidity.

Next, the air conditioner 100 may calculate the temperature difference between the calculated dew point temperature and the indoor heat exchanger temperature and the change amount of the indoor heat exchanger temperature (230).

The air conditioner 100 may calculate the temperature difference between the dew point temperature and the indoor heat exchanger temperature through Equation 2, and calculate the change amount of the indoor heat exchanger temperature through Equation 3.

$$E[n]=TE[n]-Z[n] \quad \text{[Equation 2]}$$

$$\Delta E[n]=TE[n]-TE[n-1] \quad \text{[Equation 3]}$$

In this case, TE may represent the indoor heat exchanger temperature, Z is the dew point temperature, E [n] may refer to the temperature difference between the dew point temperature and the indoor heat exchanger temperature, and ΔE [n] may refer to the amount of change in the indoor heat exchanger temperature.

Next, the air conditioner 100 may calculate the frequency change amount of the compressor by using the calculated temperature difference between the dew point temperature and the indoor heat exchanger temperature and the change amount of the indoor heat exchanger temperature (240).

Specifically, the air conditioner 100 may calculate the frequency change amount of the compressor by applying the temperature difference between the dew point temperature and the indoor heat exchanger temperature and the change amount of the indoor heat exchanger temperature to the compressor fuzzy table.

At this time, the compressor fuzzy table decreases the compressor frequency when the indoor heat exchanger temperature gradually decreases or falls below the dew point temperature, and increases the compressor frequency when the indoor heat exchanger temperature is gradually increased or exceeds the dew point temperature.

In operation 240, the air conditioner 100 may calculate the frequency change amount of the compressor through Equation 4.

$$\Delta Cf=\text{Fuzzy Table}[E,\Delta E] \quad \text{[Equation 4]}$$

At this time, ΔCf may be the frequency change amount of the compressor, E may be the temperature difference between the dew point temperature and the indoor heat exchanger temperature, and ΔE may refer to the amount of change in the indoor heat exchanger temperature. Next, the air conditioner 100 may calculate the current compressor frequency based on the previous compressor frequency and the frequency change amount of the compressor (250).

The air conditioner 100 may calculate the current compressor frequency through Equation 5.

$$Cf[n]=Cf[n-1]+\Delta Cf \quad \text{[Equation 5]}$$

In this case, Cf [n] may refer to the current compressor frequency, Cf [n−1] may refer to the previous compressor frequency, and ΔCf may refer to the frequency conversion amount of the compressor.

Next, the air conditioner 100 may control the compressor by using the current compressor frequency (260).

As described above, the disclosed invention applies the temperature difference between the dew point temperature and the indoor heat exchanger temperature and the amount of change in the indoor heat exchanger temperature to the compressor fuzzy table so that the frequency of the compressor is gradually subdivided by increasing or decreasing. In addition, the frequency control vibration (Hunting) is reduced compared to the conventional control to control the compressor frequency based on the current temperature and the set temperature only when the frequency band changes suddenly, and accordingly, it can be easy to follow the target frequency value.

Figure 4:
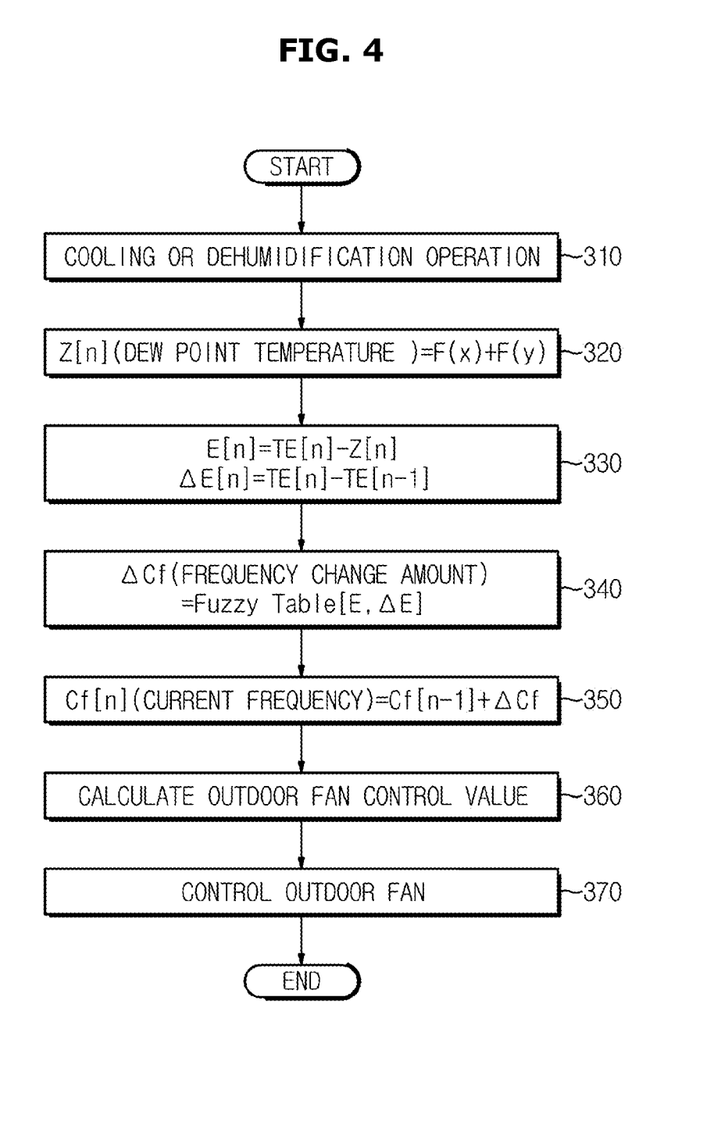
FIG. 4 is a flowchart illustrating a method of controlling an outdoor fan during the cooling or dehumidification operation of FIG. 3.

FIG. 4 is a flowchart illustrating a method of controlling an outdoor fan during the cooling or dehumidification operation of FIG. 3.

Referring to FIG. 4, when the cooling or dehumidifying operation is driven, the air conditioner 100 may calculate the dew point temperature by using the humidity value detected by the indoor humidity sensor 115 and the indoor set temperature (310 and 320). In this case, the indoor set temperature may be input by the user through the input 111 or may be preset in the air conditioner 100.

Next, the air conditioner 100 may calculate the temperature difference between the calculated dew point temperature and the indoor heat exchanger temperature and the change amount of the indoor heat exchanger temperature (330).

Next, the air conditioner 100 may calculate the frequency change amount of the compressor by using the calculated temperature difference between the dew point temperature and the indoor heat exchanger temperature and the change amount of the indoor heat exchanger temperature (340).

Specifically, the air conditioner 100 may calculate the frequency change amount of the compressor by applying the temperature difference between the dew point temperature and the indoor heat exchanger temperature and the change amount of the indoor heat exchanger temperature to the compressor fuzzy table.

At this time, the compressor fuzzy table decreases the compressor frequency when the indoor heat exchanger temperature gradually decreases or falls below the dew point temperature, and increases the compressor frequency when the indoor heat exchanger temperature is gradually increased or exceeds the dew point temperature.

Next, the air conditioner 100 may calculate the current compressor frequency based on the previous compressor frequency and the frequency change amount of the compressor (350).

Next, the air conditioner 100 calculates a rotation speed control value of the outdoor fan (14 in FIG. 1) by using the current compressor frequency and the outdoor temperature, and controls the outdoor fan 14 by using the rotational speed control value of the outdoor fan 14 (360, 370).

Figure 5:
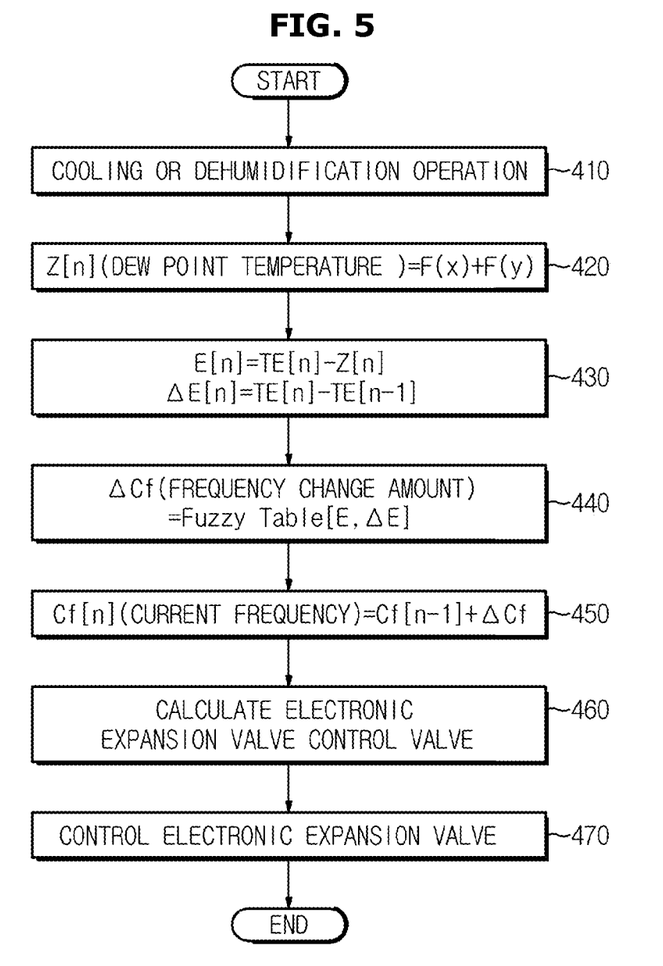
FIG. 5 is a flowchart illustrating a control method of an electromagnetic expansion valve in the cooling or dehumidifying operation of FIG. 3.

FIG. 5 is a flowchart illustrating a control method of an electromagnetic expansion valve in the cooling or dehumidifying operation of FIG. 3.

Referring to FIG. 5, when the cooling or dehumidifying operation is driven, the air conditioner 100 may calculate the dew point temperature by using the humidity value detected by the indoor humidity sensor 115 and the indoor set temperature (410 and 420). In this case, the indoor set temperature may be input by the user through the input 111 or may be preset in the air conditioner 100.

Next, the air conditioner 100 may calculate the temperature difference between the calculated dew point temperature and the indoor heat exchanger temperature and the change amount of the indoor heat exchanger temperature (430).

Next, the air conditioner 100 may calculate the frequency change amount of the compressor by using the calculated temperature difference between the dew point temperature and the indoor heat exchanger temperature and the change amount of the indoor heat exchanger temperature (440).

Specifically, the air conditioner 100 may calculate the frequency change amount of the compressor by applying the temperature difference between the dew point temperature and the indoor heat exchanger temperature and the change amount of the indoor heat exchanger temperature to the compressor fuzzy table.

At this time, the compressor fuzzy table decreases the compressor frequency when the indoor heat exchanger temperature gradually decreases or falls below the dew point temperature, and increases the compressor frequency when the indoor heat exchanger temperature is gradually increased or exceeds the dew point temperature.

Next, the air conditioner 100 may calculate the current compressor frequency based on the previous compressor frequency and the amount of change in the compressor (450).

Next, the air conditioner 100 calculates a control value of the electronic expansion valve (17 in FIG. 1) by using the current compressor frequency, room temperature, and outdoor temperature, and the electronic expansion valve may be controlled using the calculated control value of the electronic expansion valve (460, 470).

Meanwhile, the disclosed embodiments may be implemented in the form of a recording medium for storing instructions executable by a computer. The instructions may be stored in the form of a program code, and when executed by a processor, may generate a program module to perform the operations of the disclosed embodiments. The recording medium may be implemented as a computer-readable recording medium.

The computer-readable recording medium includes all kinds of recording media having stored thereon instructions which can be read by a computer. For example, there may be read only memory (ROM), random access memory (RAM), a magnetic tape, a magnetic disk, a flash memory, an optical data storage device, and the like.

Although a few embodiments of the disclosure have been shown and described, it would be appreciated by those skilled in the art that changes may be made in these embodiments without departing from the principles and spirit of the disclosure, the scope of which is defined in the claims and their equivalents.

The invention claimed is:

1. An air conditioner, comprising:
a compressor;
an indoor heat exchanger temperature sensor configured to sense an indoor heat exchanger temperature;
an indoor humidity sensor configured to sense indoor humidity; and
a controller configured to calculate a dew point temperature using a humidity value detected by the indoor humidity sensor and an indoor set temperature, and control a frequency of the compressor based on the calculated dew point temperature and the indoor heat exchanger temperature,
wherein the controller is further configured to calculate a frequency change amount of the compressor based on a temperature difference between the dew point temperature and the indoor heat exchanger temperature and a change amount of the indoor heat exchanger temperature, and
wherein the controller is further configured to calculate a current compressor frequency by reflecting the frequency change amount of the compressor on a previous compressor frequency, and control a frequency of the compressor based on the calculated current compressor frequency.

2. The air conditioner of claim 1, wherein the controller calculates the frequency change amount of the compressor by applying the temperature difference between the dew point temperature and the indoor heat exchanger temperature and the change amount of the indoor heat exchanger temperature to a compressor fuzzy table.

3. The air conditioner of claim 2, wherein the compressor fuzzy table is configured to decrease the compressor frequency when the indoor heat exchanger temperature is gradually lowered or falls below the dew point temperature, and increase the compressor frequency when the indoor heat exchanger is gradually increased or exceeds the dew point temperature.

4. The air conditioner of claim 1, wherein the controller calculates the current compressor frequency based on a previous compressor frequency and the frequency change amount of the compressor, and controls a rotation speed of an outdoor fan using the calculated current compressor frequency and an outdoor temperature.

5. The air conditioner of claim 1, wherein the controller calculates the current compressor frequency based on a previous compressor frequency and the frequency change amount of the compressor, and controls an electronic expansion valve using the calculated current compressor frequency and indoor and outdoor temperatures.

6. The air conditioner of claim 1, wherein the controller controls to maintain the indoor heat exchanger temperature to be lower than the dew point temperature.

7. A method of controlling an air conditioner, the method comprising:
calculating a dew point temperature using a humidity value detected by an indoor humidity sensor and an indoor set temperature when a cooling or dehumidification operation is driven;
calculating a temperature difference between the dew point temperature and an indoor heat exchanger temperature, and a temperature change amount of an indoor heat exchanger;
calculating a frequency change amount of a compressor based on the temperature difference between the dew point temperature and the indoor heat exchanger temperature and the temperature change amount of the indoor heat exchanger;
calculating a current compressor frequency by reflecting the frequency change amount of the compressor on a previous compressor frequency; and
controlling the compressor using the current compressor frequency.

8. The method of claim 7, wherein the calculating of the frequency change amount of the compressor comprises applying the temperature difference between the dew point temperature and the indoor heat exchanger temperature and the change amount of the indoor heat exchanger temperature to a compressor fuzzy table, to calculate the frequency change amount of the compressor.

9. The method of claim 8, wherein the compressor fuzzy table is configured to decrease the compressor frequency when the indoor heat exchanger temperature is gradually lowered or falls below the dew point temperature, and increase the compressor frequency when the indoor heat exchanger is gradually increased or exceeds the dew point temperature.

10. The method of claim 7, further comprising:
controlling a rotation speed of an outdoor fan using the calculated current compressor frequency and an outdoor temperature.

11. The method of claim 10, wherein the calculating of the frequency change amount of the compressor comprises applying the temperature difference between the dew point temperature and the indoor heat exchanger temperature and the change amount of the indoor heat exchanger temperature to a compressor fuzzy table, to calculate the frequency change amount of the compressor.

12. The method of claim 7, further comprising:
controlling an electronic expansion valve using the calculated current compressor frequency and indoor and outdoor temperatures.

13. The method of claim 12, wherein the calculating of the frequency change amount of the compressor comprises, applying the temperature difference between the dew point temperature and the indoor heat exchanger temperature and the change amount of the indoor heat exchanger temperature to a compressor fuzzy table, to calculate the frequency change amount of the compressor.

\* \* \* \* \*